Figure 1:
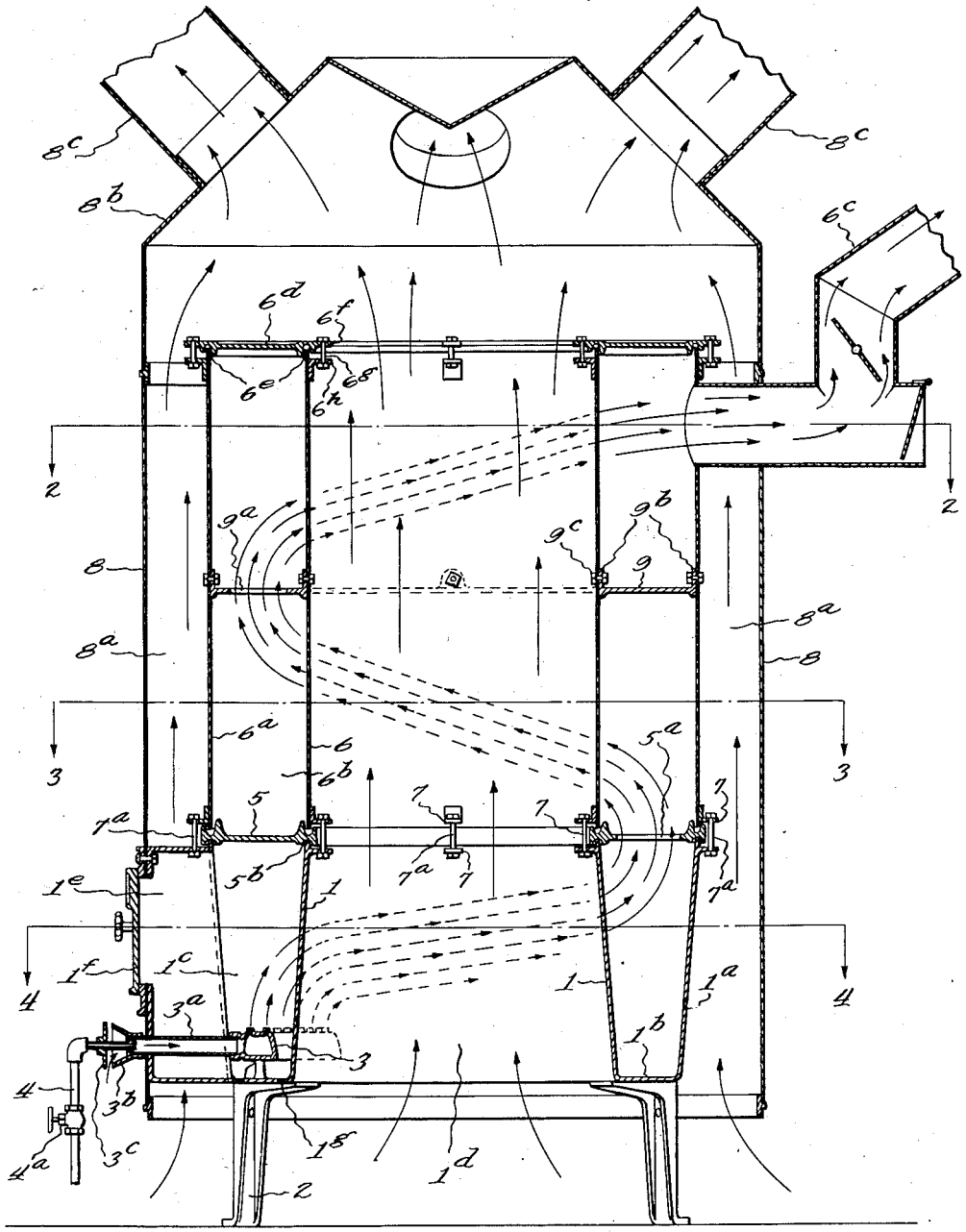

March 24, 1925.  1,531,223

A. H. ROBINSON

HEATING FURNACE

Filed March 18, 1924   3 Sheets-Sheet 1

Inventor
Arthur H. Robinson
By
Attorney

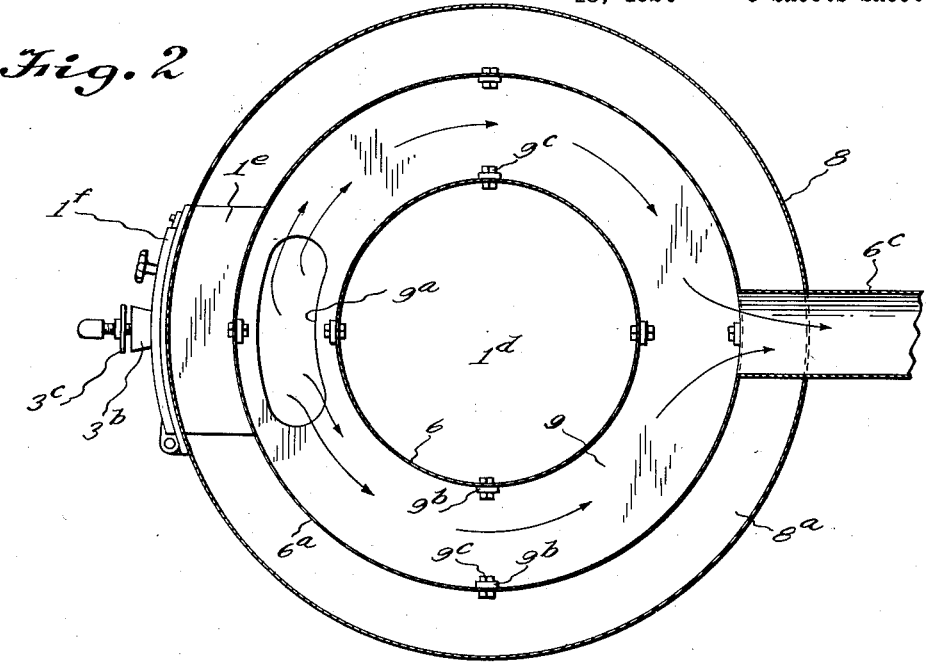
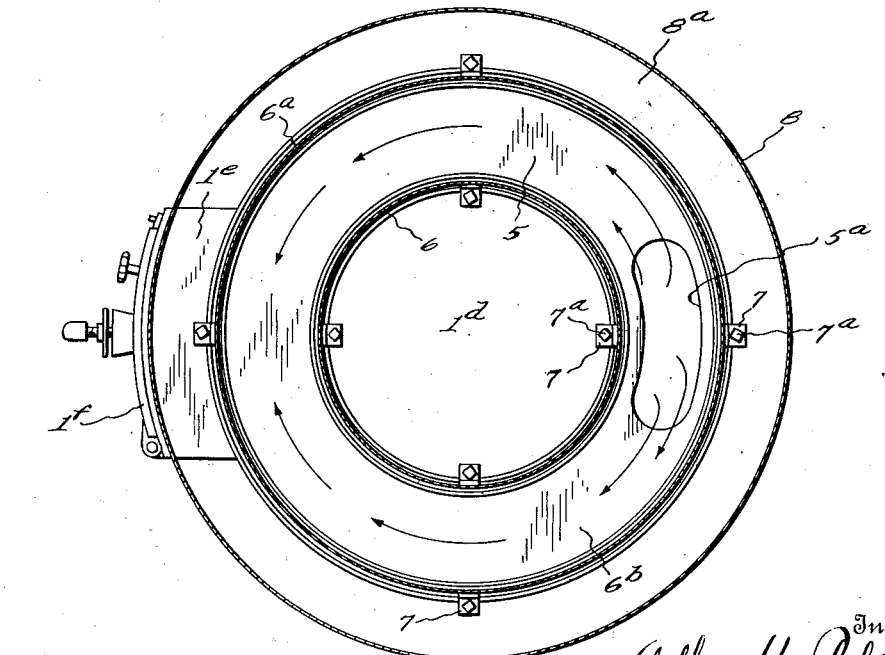

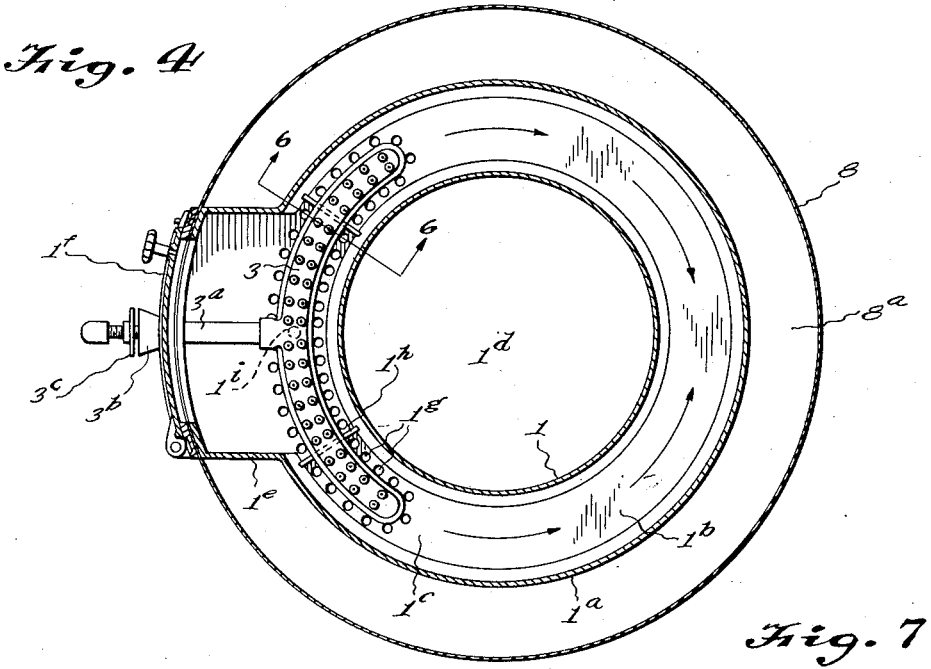
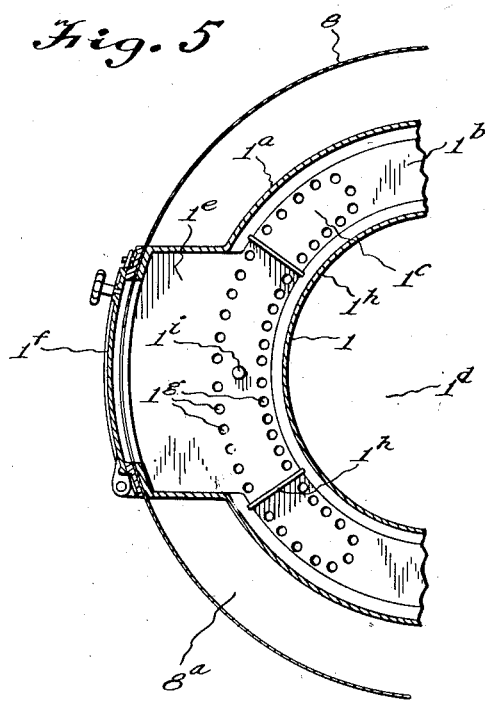
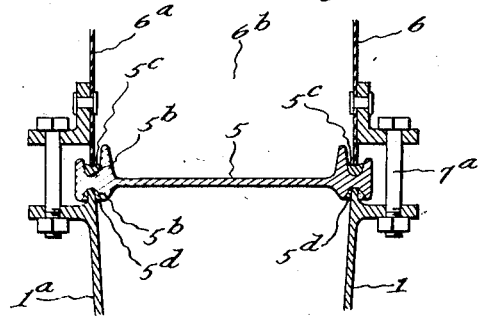
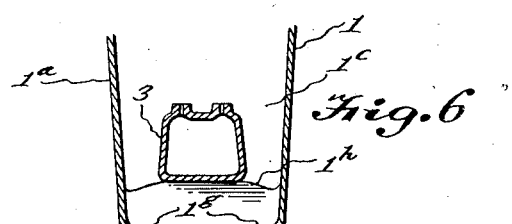

Patented Mar. 24, 1925.

1,531,223

UNITED STATES PATENT OFFICE.

ARTHUR H. ROBINSON, OF LAKEWOOD, OHIO.

HEATING FURNACE.

Application filed March 18, 1924. Serial No. 699,984.

*To all whom it may concern:*

Be it known that I, ARTHUR H. ROBINSON, a citizen of the United States, residing at Lakewood, in the county of Cuyahoga and State of Ohio, have invented certain new and useful Improvements in Heating Furnaces, of which the following is a specification.

My invention relates to improvements in heating furnaces, the present embodiment being particularly designed and adapted for use as a gas heating furnace.

The primary object of the invention is to provide a generally improved furnace of the type indicated, which will be exceedingly simple in construction, cheap of manufacture, and efficient in use.

A further and very important object is the provision of an improved gas furnace adapted to generate a maximum number of heat units with a minimum consumption of gas, as well as to provide an increased heating area for the air to be heated, this being brought about through the provision of an improved construction and arrangement of fire-pot and radiator sections forming central and annular passages for the air to be heated, the fire-pot and radiator sections being of ring-shape or annular form made up of inner and outer walls spaced from each other forming an annular chamber of substantially U-shape in cross section for the products of combustion. As a further means of accomplishing the result referred to, the annular or ring-shaped fire-box and radiator sections are provided with baffle rings having oppositely arranged flue openings adapted to divert the products of combustion in opposite semi-circular paths throughout said annular chamber of the ring-shaped fire-box and radiator sections, as will hereinafter more fully appear.

With the above mentioned and other ends in view, the invention consists in the novel construction, arrangement and combination of parts, hereinafter referred to, illustrated in one of its embodiments in the accompanying drawings, and particularly pointed out in the appended claims.

Referring to the drawings, forming a part of this specification, Figure 1 is a central vertical sectional view of a furnace constructed in accordance with this invention.

Fig. 2, a cross sectional view, taken on line 2—2 of Fig. 1.

Fig. 3, a cross sectional view, taken on line 3—3 of Fig. 1.

Fig. 4, a cross sectional view, taken on line 4—4 of Fig. 1.

Fig. 5, a fragmentary cross sectional view similar to Fig. 4, the improved gas burner and pipe connections being removed for the purpose of clearer illustration of the subjacent parts.

Fig. 6, an enlarged fragmentary cross sectional view, taken on line 6—6 of Fig. 4.

Fig. 7, an enlarged fragmentary cross sectional view of the connected or jointed portions of the fire-box and radiator sections, and illustrating in particular the ring and clamp connections therebetween.

Similar numerals of reference designate like parts throughout all the figures of the drawings.

The improved furnace comprises annular or ring-shaped fire-box and radiator sections constructed and arranged as hereinafter referred to.

The fire-pot section is made up of inner and outer walls 1 and $1^a$, respectively, connected by means of an annular base portion $1^b$, and spaced from each other forming an annular or intermediate combustion chamber $1^c$, of substantially U-shape in cross section, as shown most clearly in Fig. 1 of the drawings.

The inner wall 1 of the fire-pot section provides a central space or passage $1^d$, for initially receiving a portion of the air to be heated and later distributed through the hot air manifold and conduits or distributing pipes.

As a convenient means of supporting the fire-pot and radiator sections of the furnace, the base portion of the fire-pot section may be provided with suitable legs or supports 2, as shown. The outer wall $1^a$ of the annular fire-pot section is provided with a door neck portion $1^e$ and a suitable door opening adapted to be closed by means of a suitable door $1^f$.

As a means of providing for a suitable supply of secondary air to support combustion at the burner, the base $1^b$ of the fire-pot is provided with a plurality of arcuately arranged secondary air inlet openings $1^g$, and as a means of heating the walls of the fire-pot and radiator in this type of heating furnace, a burner bar 3, is arranged above the secondary inlet openings $1^g$, as shown, said burner bar being preferably of segmental or arcuate form above the secondary air inlet openings and following the general arrangement of the latter. As a means of conveniently supporting the burner bar 3 upon the base of the fire-pot and just inside of the neck portion 1ᵉ thereof, suitable supporting ribs or brackets 1ʰ, are preferably cast with the bottom portion of the fire-pot with an intermediate lug 1ⁱ, to support the median portion of the burner bar 3. The burner 3 may be supplied with fuel by means of a supply or fuel pipe 3ᵃ, extending outwardly through the door neck portion of the furnace and terminating in a mixer head 3ᵇ, adapted to be controlled by means of an adjustably mounted shutter disc 3ᶜ, said feed pipe 3ᵃ communicating with a suitable supply pipe 4, provided with a valve 4ᵃ, leading to a suitable source of fuel supply.

As a means of diverting the products of combustion rearwardly and in a semi-circular path within the sides of the substantially U-shaped combustion chamber and also as a convenient means of mounting and connecting the superposed radiator section, hereinafter referred to, a cap ring 5, is provided, said cap ring being provided at its rear with a flue opening 5ᵃ, and being preferably provided with oppositely arranged grooves 5ᵇ, adapted to receive the marginal edges of the inner and outer walls of the fire-pot section and the superposed radiator section. The upper grooves may be packed with suitable packing material, such as asbestos 5ᶜ, and the lower grooves may be filled with cement as at 5ᵈ, as shown most clearly in Fig. 7 of the drawings, so as to form a fluid tight joint or connection.

The superposed radiator section comprises inner and outer cylindrical walls 6 and 6ᵃ, spaced apart and conjointly forming an annular air circulating space or chamber 6ᵇ, for receiving the products of combustion from the annular combustion chamber of the fire-box, the inner wall of the radiator section forming a central passage or flue for the air to be heated coming up from the central space 1ᵈ within the fire-pot, as shown most clearly in Fig. 1 of the drawings. As a means of closing the annular chamber or space at the top of the radiator section and also diverting the products of combustion into the chimney flue pipe 6ᶜ at the top, a cap ring 6ᵈ, is provided, said ring 6ᵈ being preferably provided with grooves 6ᵉ, on its under side to receive the upper edges of the inner and outer walls of the radiator section. The cap ring may be provided with lugs 6ᶠ on its inner and outer peripheries and provided with connecting elements or bolts 6ᵍ, extending through similar lugs or brackets 6ʰ, on the upper edges of the inner and outer walls of the radiator section.

As a convenient means of connecting the edges of the walls of the radiator section to the fire-pot section below and securing and clamping the interposed cap ring 5, the adjacent edges of the walls may be provided with brackets or lugs 7, connected by means of connecting bolts 7ᵃ, as shown most clearly in Figs. 1 and 7 of the drawings.

As a means of providing an annular or outer air circulating space 8ᵃ, about the outer wall 1ᵃ, of the fire pot and radiator sections to receive heat therefrom, a suitable furnace casing 8, is provided, said casing being open at its bottom and provided at its top with a hot-air distributing manifold 8ᵇ, provided with suitable hot-air conduits or distributing pipes 8ᶜ, adapted to receive the heated air from the central space formed between the inner wall of the fire-pot and radiator sections and the annular space 8ᵃ, as indicated by the arrows in Fig. 1 of the drawings.

It will be seen that the ring members 5 and 6ᵈ form also in effect baffle members above the fire-pot and radiator sections, and as a means of diverting the products of combustion from the flue opening 5ᵃ and in opposite semi-circular paths in the annular chamber of the radiator section, an intermediate baffle ring 9, is interposed between the walls of the radiator section, said baffle ring 9 being provided at one side with a flue opening 9ᵃ, arranged diametrically opposite the flue opening 5ᵃ and the chimney flue pipe 6ᶜ. The intermediate baffle ring 9 may be provided with lugs 9ᵇ, and bolts 9ᶜ, for securing the same in position, as shown most clearly in Figs. 1 and 2 of the drawings.

The walls of the fire-pot are preferably formed of cast metal, while the walls of the radiator section are preferably formed of suitable sheet metal, as indicated most clearly in Figs. 1 and 7 of the drawings.

It will be seen that the inner and outer walls 1 and 1ᵃ of the cast fire-pot section surrounding the central space or passage 1ᵈ and surrounded by the outer air circulating space 8ᵃ form relatively large heating surfaces or areas for heating the air in its passage upwardly and that the walls 1 and 1ᵃ and the bottom portion 1ᵇ form an annular combustion chamber 1ᶜ of substantially U-shape in cross section adapted to transmit a maximum amount of heat through the walls 1 and 1ᵃ, and it will also be apparent that the detachable cap ring 5 for connecting or coupling the superposed radiator section to the fire-pot section enables the radiator section to be readily removed as in inspection or repair of parts.

Having thus described one of the embodiments of my invention, without having attempted to set forth all the forms in which it may be made, or all the modes of its use, what I claim and desire to secure by Letters Patent is,—

1. In a gas heating furnace, superposed annular fire-pot and radiator drum sections, including section coupling and intermediate baffle ring members diverting the products of combustion in semi-circular paths therein.

2. In a gas heater, a fire-pot made up of bottom and side walls surrounding a common air circulating space and conjointly providing a combustion chamber of substantially U-shape in cross section.

3. In a gas heating furnace, a ring-shaped fire-box provided at one side with secondary air inlet openings, a burner arranged adjacent to said secondary air inlet openings, and a cap ring having a flue opening at the opposite side for the escape of the products of combustion in semi-circular paths from said burner.

4. In a gas furnace, detachably connected fire-pot and radiator sections made up of spaced walls forming an annular space for the products of combustion and a central vertical air circulating space within said sections, and a furnace casing spaced from said fire-pot and radiator sections conjointly therewith forming an annular air circulating space outside of said sections.

5. A heating furnace, comprising an annular fire-pot of substantially U-shape in cross section, an annular demountable heating drum superposed thereon, a furnace casing surrounding said pot and drum and terminating in a hot air distributing manifold, said fire-pot and drum being provided with detachable baffle rings having oppositely arranged flue openings diverting the products of combustion in semi-circular paths within said fire-pot and drum.

6. In a gas furnace, fire-pot and radiator sections made up of inner and outer walls providing an annular chamber for the products of combustion and a central passage between said inner walls, a cap ring for said radiator section, and baffle rings between said inner and outer walls of said sections for diverting the products of combustion in a circuitous course through said annular chamber of said fire-pot and radiator sections, one of said rings being interposed between said fire-pot and radiator sections and being provided with means for detachably connecting the same.

7. In a gas heater, a fire-pot section made up of a bottom and inner and outer walls surrounding a central air circulating space and conjointly providing a combustion chamber of substantially U-shape in cross section, said fire-pot section having a door neck and a burner at one side, and a demountable fire-pot cap-ring having a flue opening diametrically opposite said door neck and burner and diverting the products of combustion in semi-circular paths in said combustion chamber, said demountable fire-pot ring being also provided with means for detachably supporting and connecting a superposed radiator section.

8. In a gas furnace, a fire-pot having a vertical air circulating space and comprising inner and outer walls forming a surrounding annular combustion chamber, a burner and draft openings at one side of said fire-pot, a ring above said fire-pot provided with a flue opening diametrically opposite said draft openings and burner for diverting the products of combustion in two curved paths, and a demountable radiator section having an annular chamber provided with demountable baffle rings having diametrically opposite flue openings for diverting the products of combustion in two curved paths in said annular chamber first in one direction and then in an opposite direction.

9. In a gas furnace, a fire-pot including a vertical air circulating space surrounded by inner and outer walls forming a surrounding annular combustion chamber of substantially U-shape in cross section, a door and burner at one side of said fire-pot, a demountable cap ring above said fire-pot and provided with a flue opening opposite said door and burner for diverting the products of combustion in semi-circular paths therein, and a detachable double walled radiator section surmounting said ring and fire-pot and provided with removable baffle rings diverting the products of combustion in oppositely directed semi-circular paths.

In testimony whereof I have affixed my signature.

ARTHUR H. ROBINSON.